US006262174B1

(12) United States Patent
Cooper et al.

(10) Patent No.: US 6,262,174 B1
(45) Date of Patent: Jul. 17, 2001

(54) POLYMER COMPOSITIONS WHICH EXHIBIT HIGH HOT TACK

(75) Inventors: James L. Cooper; Nicole F. Whiteman, both of Lake Jackson, TX (US)

(73) Assignee: The Dow Chemical Company, Midland, MI (US)

( * ) Notice: Subject to any disclaimer, the term of this patent is extended or adjusted under 35 U.S.C. 154(b) by 0 days.

(21) Appl. No.: 09/335,401

(22) Filed: Jun. 17, 1999

(51) Int. Cl.$^7$ .............................. C08F 8/00; C08L 23/00; C08L 53/00; B32B 15/08; B32B 27/08
(52) U.S. Cl. ........................... 525/88; 525/191; 525/240; 428/461; 428/474.4; 428/483; 428/500; 428/511; 428/515
(58) Field of Search ............................ 525/88, 191, 240; 428/461, 474.4, 483, 500, 511, 515, 688

(56) References Cited

U.S. PATENT DOCUMENTS

| 4,339,507 | 7/1982 | Kurtz et al. ............................ 428/522 |
| 5,147,936 | * 9/1992 | Peszkin et al. ....................... 525/240 |
| 5,358,792 | 10/1994 | Mehta et al. .......................... 428/516 |
| 5,424,362 | 6/1995 | Hwang et al. ........................... 525/71 |
| 5,674,342 | 10/1997 | Obijeski et al. ................. 156/244.11 |
| 5,685,128 | 11/1997 | Chum et al. ............................. 53/441 |
| 5,741,861 | 4/1998 | Yamamoto et al. ................... 525/240 |
| 5,847,284 | 12/1998 | Theller ................................... 73/827 |
| 6,086,967 | * 7/2000 | Whiteman et al. .................. 428/35.7 |

FOREIGN PATENT DOCUMENTS

| WO 92/14784 | 9/1992 | (WO) . |
| 93/11940 | 6/1993 | (WO) . |
| WO 97/28960 | 8/1997 | (WO) . |
| WO 98/37139 | 8/1998 | (WO) . |
| WO 98/37142 | 8/1998 | (WO) . |

OTHER PUBLICATIONS

Opposition on behalf of The Dow Chemical Company against European Patent 0 600 482 B1, Titled:*Resin composition for laminates*, Proprietor: Mitsubishi Chemical Corporation (JP), (Jan. 8, 1999).

Letter from the proprietor of the patent of Jul. 30, 1999.

Communication pursuant to Article 101(2) and Rule 58(1) to (3) EPC dated Mar. 2, 2000.

Exact Facts™ vol. 1, No. 1 (Feb. 1992).

J. Schut, Plastics Technology pp. 15–19, Nov. 1991.

C. S. Speed et al., "Structure/Property Relationships in Exxpol™ Polymers", Polyolefins VII International Conference in Houston, Feb. 24–27, 1991.

Gregory McPike, "Polyolefin Markets and Exxon's "Exxpol" Technology", Presentation to 1992 Dewitt Petrochemical Review in Houston, Texas, Mar. 25–27, 1992.

D.G.F. Van der Sanden, R.E. Halle, "A new family of linear ethylene polymers provides enhanced sealing performance", Tappi Journal, Feb. 1992, pp. 99–102.

L. Wild et al., "Influence of Long–Chain Branching on the Viscoelastic properties of Low–Density Polyethylenes", Polymer Engineering and Science, vol. 16, No. 12, pp. 811–816 (Dec. 1976).

K. Tominari (Mitsui), "Special Application and Markets for Ethylene Alpha–Olefin Copolymers in Japan", Specialty Plastics Conference '86 (Nov. 13–15, 1986 in Zuerich).

T.I. Butler, "Low Density Polyethylene", Chapter 19A, pp. 453–470 in Film Extrusion Manual–Process, Materials, Properties, TAPPI Press, Atlanta, USA, 1992. (No month).

E.C. Kelusky et al., "Characterizing Polyethylene–Based Blends with Temperature Rising Elution Fractionation (TREF) Techniques", Polymer Engineering and Science, vol. 27, No. 20, pp. 1562–1571 (Mid–Nov. 1987).

* cited by examiner

*Primary Examiner*—Nathan M. Nutter

(57) ABSTRACT

The present invention relates to film layers and compositions having improved hot tack properties. The compositions comprise polypropylene and linear ethylene polymer, substantially linear ethylene polymer or low density ethylene polymer. The compositions are suitable for use as, for example, laminates or films in packaging applications.

36 Claims, 4 Drawing Sheets

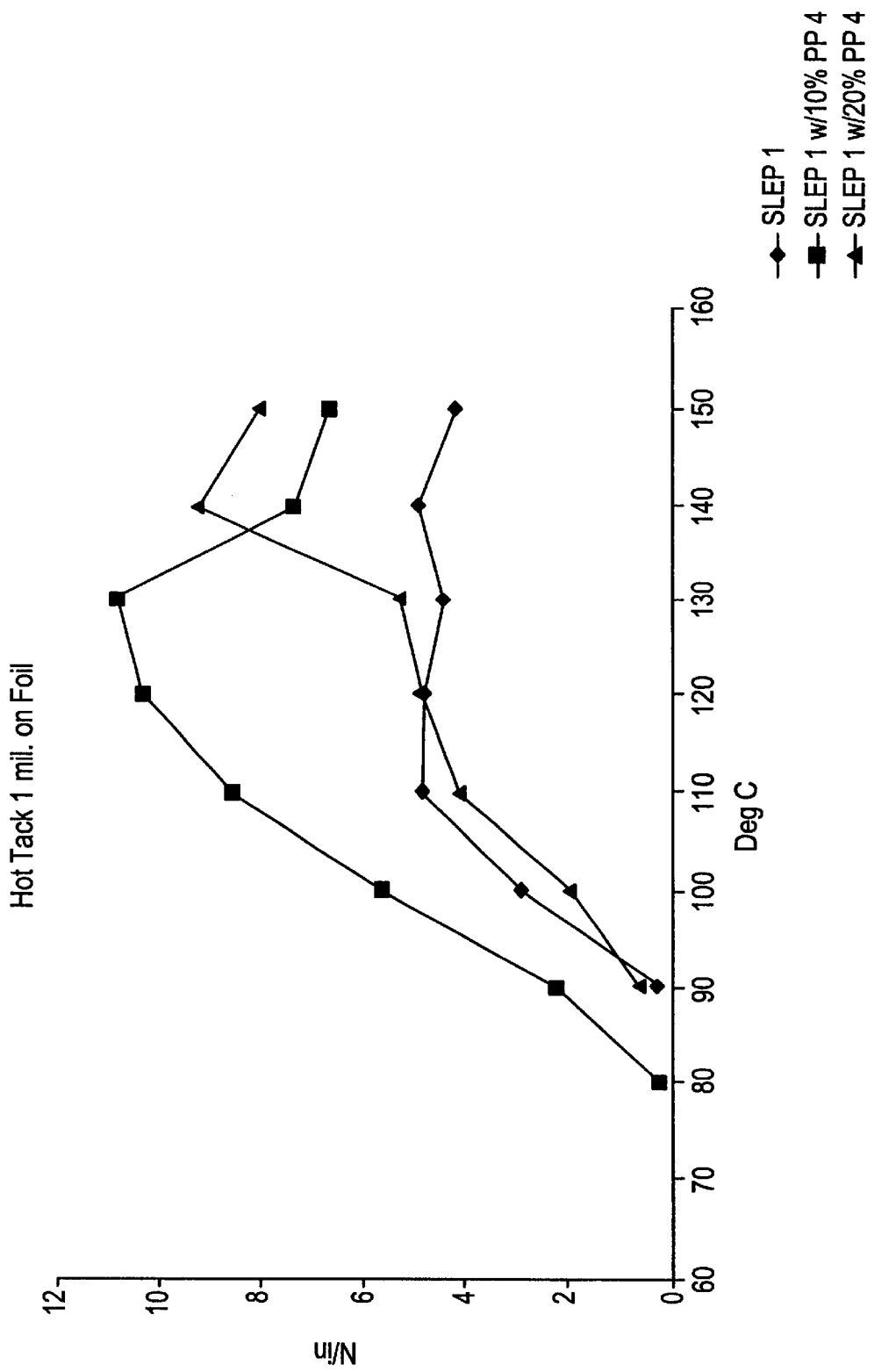

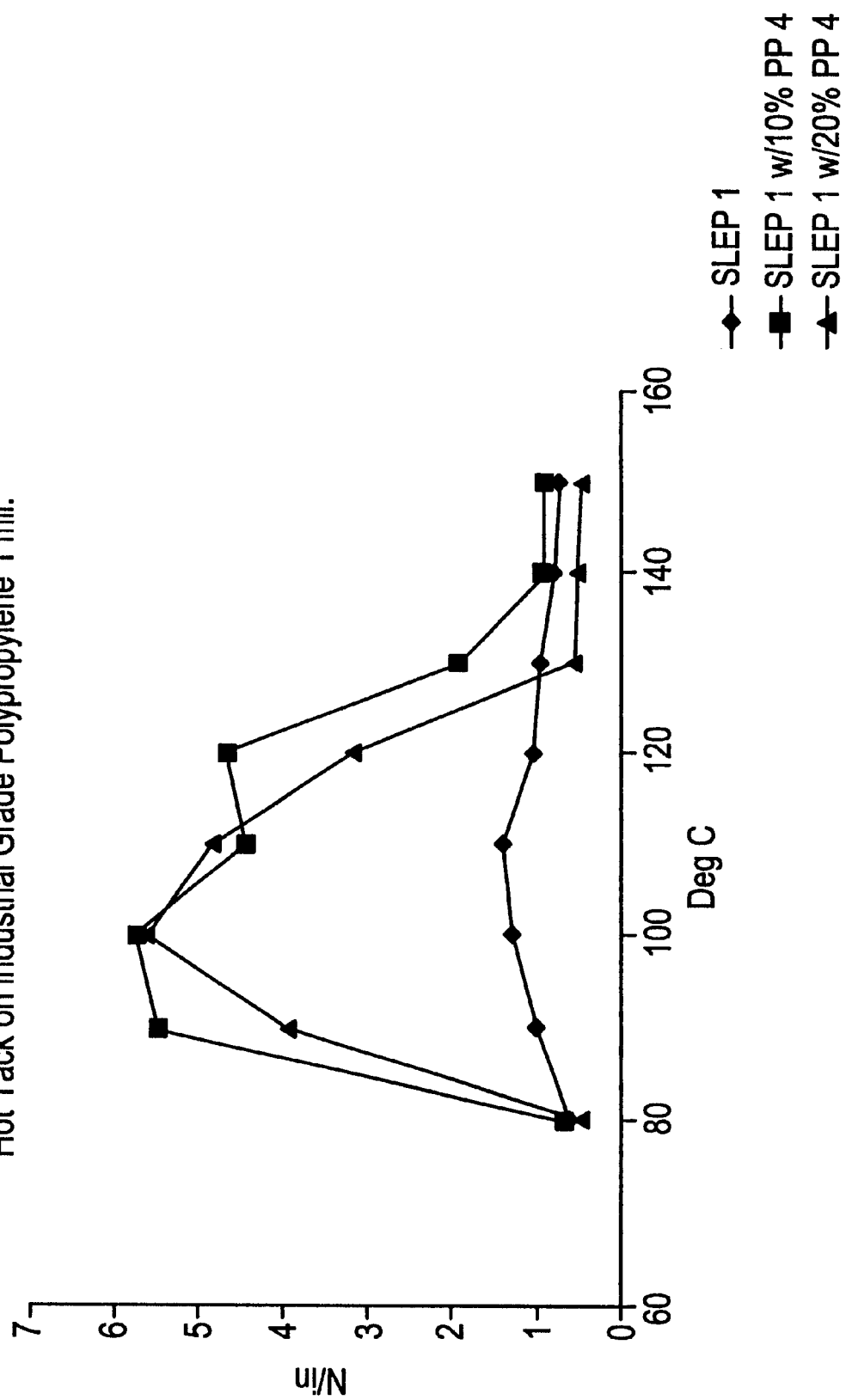

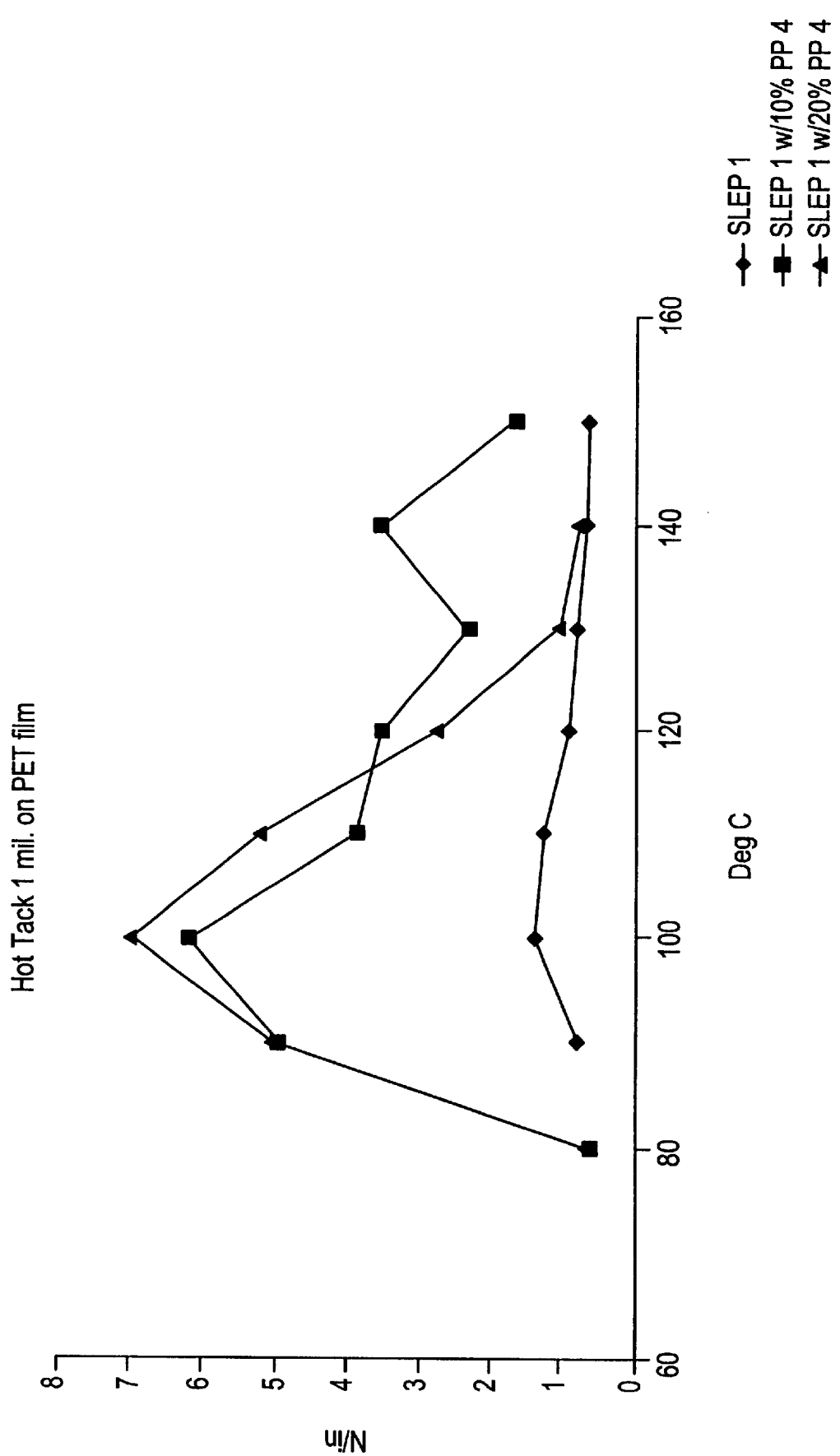

POLYMER COMPOSITIONS WHICH EXHIBIT HIGH HOT TACK

FIELD OF THE INVENTION

The present invention relates to polymer compositions having improved hot tack properties and which are often suitable for coatings and films. More particularly, the invention relates to laminates or multi-layer films having at least one film layer comprising polypropylene or a copolymer thereof and linear ethylene polymer, substantially linear ethylene polymer or low density ethylene polymer.

BACKGROUND AND SUMMARY OF THE INVENTION

It is often desirable to coat an article, substrate or film in order to modify the properties. A particularly desirable coating is that of a heat-sealable film, i.e., a film which is capable of being bonded to itself, another film or another substrate with the application of heat and/or pressure. In this manner, the article, substrate or film can be sealed to form structures such as bags or other packaging materials.

Laminates and single or multi-layer films are two packaging materials that often employ heat-sealable layers. Laminates are conveniently made by coating a substrate, for example, paper or film, with a heat-sealable layer by extrusion coating. Extrusion coating is a process whereby a polymer or blend of polymers is fed into an extruder hopper. In the hopper the polymer or blend is melted and passed through a die to form a web. The web is then extruded onto the substrate through a nip roll/chill roll interface, for example, so that the molten web is pressed onto the substrate. The substrate is cooled by the chill roll and the wound up at a winder.

Similarly, many different processes are often employed to make single or multi-layer films which are useful as packaging materials. Such processes can include bubble extrusion and biaxial orientation processes, as well as, tenter frame techniques. In order to facilitate sealing, the heat-sealable film is usually employed singly or as the outermost or innermost layer in the case of multi-layer films.

Laminates and single or multi-layer films having a heat-sealable film layer are often used in "form, fill, and seal" machines. These machines create from film a continuous stream of packages that are capable of being closed by film-to-film seals. Often such packages are sealed via heat seal jaws that apply heat and pressure to form the film-to-film seal closure.

The heat seal closures made via the heat seal jaws will often be strongest after the seal has cooled to ambient temperature. However, in order to increase the production capacity, the packages are often filled with product before the bottom seal has had time to completely cool, therefore, the polymers at the seal interface haven't completely solidified (or recrystallized) or they are still in a softened state. Thus, the closure must exhibit a sufficient strength very rapidly without the need for cooling to ambient temperature. Otherwise, the closure will be destroyed by the weight of the product when the package is filled.

"Seal strength" is the strength of a heat seal at ambient temperature after the seal has been formed and reached its full strength. However, as described above the properties of the seal at temperatures subsequent to formation but prior to cooling to ambient conditions are often important. The properties of seal strength at temperatures above ambient are often referred to as "hot tack" properties.

There are a number of different hot tack properties that are important for heat-sealable films. One important hot tack property is the "initiation temperature." The initiation temperature is the first temperature above ambient at which a seal can be formed by applying a given pressure to a given thickness of film for a given length of time. In general, lower initiation temperatures are desirable because less energy is required to be used to form the seal and also the less time it takes for the initial seal to form at a given seal jaw temperature. Thus, production rates are capable of being increased.

Another important hot tack property is "ultimate hot tack." Ultimate hot tack is the largest strength the seal has at temperatures above the initiation temperature. Usually it is desirable that the ultimate hot tack occurs at the lowest possible temperature. Another hot tack property that is generally desirable is a wide processing window such that the film exhibits a suitable seal strength as measured over a broad temperature range. Also generally desirable is high temperature hot tack such that the seal strength remains sufficient even at elevated temperatures.

The hot tack properties are often determined by the composition employed to form the film seal. In the past, compositions such as those described in U.S. Pat. No. 4,339,507 and U.S. Pat. No. 5,741,861 that are a mixture of, for example, low density polyethylene and linear low density ethylene hydrocarbon copolymer have been employed. Unfortunately, however, such compositions often have hot tack properties that may limit the production capacity. Thus, it would be desirable to discover new compositions that have improved hot tack properties.

Advantageously, a new composition has been discovered which gives superior hot tack properties. The composition comprises (a) from about 2 to about 13 percent by weight of polypropylene which is a homopolymer or a copolymer derived from at least about 80 percent propylene monomer and less than about 20 percent alpha-olefin monomer based on the total weight of the monomers, and which has a melt flow rate of from about 1.0 to about 50 dg/minute as measured in accordance with ASTM D-1238, Condition 230° C./2.16kg.

(b) from about 87 to about 98 percent by weight of a polymer selected from the group consisting of linear ethylene polymer, substantially linear ethylene polymer, low density ethylene polymer, and mixtures thereof;

wherein the linear or substantially linear ethylene polymer is characterized by:

(1) a density of from about 0.87 to about 0.960 g/cm$^3$, (2) a molecular weight distribution, $M_w/M_n$ of less than or equal to about 5, and (3) a melt index, $I_2$, as measured in accordance with ASTM D-1238, Condition 190° C./2.16 kg of from about 0.5 to about 20.0 dg/minute; and wherein the low density ethylene polymer is characterized by:

(1) a density of from about 0.91 to about 0.96 g/cm$^3$, and (2) a melt index, $I_2$, as measured in accordance with ASTM D-1238, Condition 190° C./2.16 kg of from about 0.1 to about 20.0 dg/minute.

The composition is suitable for forming a film having improved hot tack and for use in coating substrates. In this manner, a heat-sealable film may be made for packaging materials. The packaging materials are beneficial in that they exhibit surprising and unexpected hot tack properties and facilitate production.

When used in extrusion coating, the compositions of the instant invention often form homogeneous extrudates, give stable extrusion rates at high take-off speeds, have acceptable neck-in, give good product properties such as hot tack, tensile strength, wide temperature range processability, and good tear and abrasion resistance.

BRIEF DESCRIPTION OF THE DRAWINGS

FIG. 2 shows the hot tack performance of compositions of the present invention coated on foil as compared to a composition of polyethylene.

FIG. 3 shows the hot tack performance of compositions of the present invention coated on oriented polypropylene as compared to a composition of polyethylene.

FIG. 4 shows the hot tack performance of compositions of the present invention coated on poly(ethylene terephthalate) as compared to a composition of polyethylene.

DETAILED DESCRIPTION OF THE INVENTION

Test Procedures and Definitions

Figure 1:
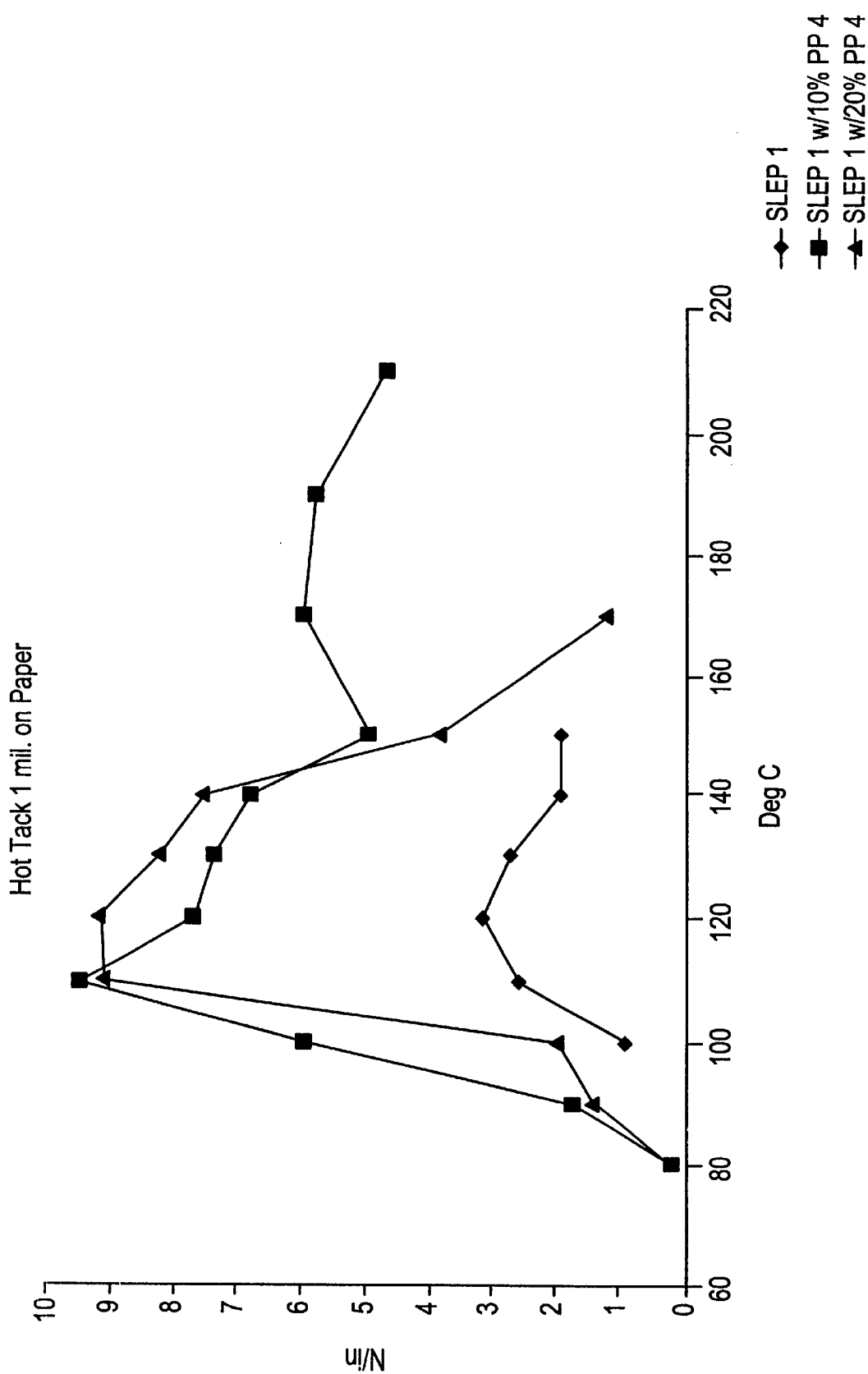
FIG. 1 shows the hot tack performance of compositions of the present invention coated on paper as compared to a composition of polyethylene.

Unless indicated otherwise, the following testing procedures are to be employed, each of which is incorporated herein by reference:

Density is measured in accordance with ASTM D-792. The samples are annealed at ambient conditions for 24 hours before the measurement is taken.

Melt index ($I_2$), (measured in the case of the homogeneous linear or substantially linear ethylene polymers or low density ethylene polymer) is measured in accordance with ASTM D-1238, condition 190° C./2.16 kg (formerly known as "Condition (E)").

Melt flow rate (measured in the case of the polypropylene polymers) is measured in accordance with ASTM D-1238, condition 230° C./2.16 kg (formerly known as "Condition (L)").

Molecular weight is determined using gel permeation chromatography (GPC) on a Waters 150° C. high temperature chromatographic unit equipped with three mixed porosity columns (Polymer Laboratories 103, 104, 105, and 106), operating at a system temperature of 140° C. The solvent is 1,2,4-trichlorobenzene, from which 0.3 percent by weight solutions of the samples are prepared for injection. The flow rate is 1.0 mL/min. and the injection size is 100 microliters.

The molecular weight determination is deduced by using narrow molecular weight distribution polystyrene standards (from Polymer Laboratories) in conjunction with their elution volumes. The equivalent polyethylene molecular weights are determined by using appropriate Mark-Houwink coefficients for polyethylene and polystyrene (as described by Williams and Word in Journal of Polymer Science, Polymer Letters, Vol. 6, (621) 1968, incorporated herein by reference) to derive the following equation:

$$M_{polyethylene} = a*(M_{polystyrene})^b.$$

In this equation, a=0.4316 and b=1.0. Weight average molecular weight, $M_w$, is calculated in the usual manner according to the following formula: $M_w = \Sigma w_i * M_i$, where $w_i$ and $M_i$ are the weight fraction and molecular weight, respectively, of the ith fraction eluting from the GPC column.

By "draw resonance" is meant a limit cycle corresponding to a sustained periodic oscillation in the velocity and cross-sectional area of a drawing process when the boundary conditions are a fixed velocity at the exit of an extruder and a fixed velocity at the take-off position.

By "neck-in" is meant the reduction in a film web width as it is extruded from a die and which will be caused by a combination of swelling and surface tension effects as the material leaves the die. Neck-in is measured as the distance between the extrudate web as it emerges from the die minus the width of the extrudate web as it is taken up.

The term "composition" as used herein includes a mixture of the materials which comprise the composition, as well as, products formed by the reaction or the decomposition of the materials which comprise the composition.

The term "derived from" means made or mixed from the specified materials, but not necessarily composed of a simple mixture of those materials. Compositions "derived from" specified materials may be simple mixtures of the original materials, and may also include the reaction products of those materials, or may even be wholly composed of reaction or decomposition products of the original materials.

Polypropylene

The composition of the present invention is suitable for forming films that exhibit surprising and unexpected hot tack. The amount of polypropylene in the composition will vary depending on the hot tack properties desired, the other components, the type of polypropylene, and the substrate. However, the composition generally comprises at least about 2, preferably at least about 3, more preferably at least about 4 percent by weight of polypropylene. Correspondingly, the amount is typically less than about 13, preferably less than about 12, more preferably less than about 10, most preferably less than about 7 percent by weight polypropylene.

The polypropylene is generally in the isotactic form of homopolymer polypropylene, although other forms of polypropylene can also be used (e.g., syndiotactic polypropylene). Polypropylene impact copolymers (e.g, those wherein a secondary copolymerization step comprised of reacting an alpha-olefin monomer such as a $C_2$—$C_8$ alpha-olefin such as ethylene with a propylene monomer so that the amount of alpha-olefin monomer in the impact modified polypropylene product is less than about 20 weight percent) and random copolymers (also usually reactor modified and usually containing 1.5 to 8 weight percent of alpha-olefin such as ethylene copolymerized with the propylene), however, can alternatively be used. A complete discussion of various polypropylene polymers useful herein is contained in Modern Plastics Encyclopedia/89, mid October 1988 Issue, Volume 65, Number 11, pp. 86–92, the entire disclosure of which is incorporated herein by reference.

The molecular weight of the polypropylene for use in the present invention is conveniently indicated using a melt flow measurement according to ASTM D-1238, Condition 230° C./2.16 kg (formerly known as "Condition (L)" and also known as $I_2$). Melt flow rate is inversely proportional to the molecular weight of the polymer. Thus, the higher the molecular weight, the lower the melt flow rate, although the relationship is not linear. The melt flow rate for the polypropylene useful herein is generally at least about 1.0, preferably at least about 6.0 dg/min. Correspondingly, the melt flow rate is generally less than about 50, preferably less than 15 dg/min.

If clarity of the film is desired in, for example, a packaging film, then the refractive index of the polypropylene polymer should be within 0.005, preferably within 0.002 refractive index units, typically measured at 589 nm, from the linear ethylene polymer, substantially linear ethylene polymer, low density ethylene polymer, or mixture thereof. Generally, polypropylene has a refractive index from about 1.470 to about 1.515, e.g., clarified polypropylene homopolymer has a refractive index of about 1.5065 and clarified polypropylene random copolymer has a refractive index of about 1.5044 at 589 nm.

Refractive index is measured using an Abbe-3L Refractometer made by Milton Roy Company and operated at 589 nm (sodium "d" line). Samples are prepared for testing in the refractometer by injection molding the polymer in a BOY 30T injection molder to a thickness of about 0.125 inches. The samples tested for physical properties are prepared in the same manner and also at a thickness of about 0.125 inches.

Chum, Silvis, and Kao, in the presentation entitled "INSITE Technology Based Polyolefin Elastomers for Impact Modification", SPO '93, presented a plot of refractive index versus density for linear ethylene polymers. From this, they derived the equations:

$$RI = 0.69694(density) + 0.87884$$
$$density = (RI - 0.87884)/0.69694$$

where RI is the refractive index of the polymer. Accordingly, when it is desirable to use a clarified polypropylene random copolymer having a refractive index of about 1.5044, preferred homogeneous linear and substantially linear ethylene polymers will have a density of about 0.898 g/cm$^3$.

To promote clarity, the viscosity of the polypropylene polymer should be less than that of the linear ethylene polymer, substantially linear ethylene polymer, low density ethylene polymer, or mixture thereof. Viscosity is inversely proportional to the melt index (in the case of the ethylene polymers) and to the melt flow rate (in the case of the polypropylene polymer). An estimate for comparing polyethylene melt index to polypropylene melt flow rate is to divide the polypropylene melt flow rate by 3. Thus a polypropylene having a melt flow rate of 12 g/10 min. is somewhat like a polyethylene having a melt index of 4 g/10 min., in terms of its viscosity or flow behavior. Accordingly, using a polypropylene having a melt flow rate of 2 or 4 g/10 min. with an ethylene polymer having a melt index of 1.6 g/10 min. would result in a blend in which the higher viscosity component constitutes the minor component of the blend, and would therefore not be preferred for obtaining low haze and high clarity film structures. In contrast, using a polypropylene having a melt flow rate of 12 g/10 min. with an ethylene polymer having a melt index of 1.6 g/10 min. would result in a blend in which the lower viscosity component constitutes the lower viscosity component of the blend, leading to improved dispersion of the minor component in the dominant homogeneous linear or substantially linear ethylene polymer phase, and thus providing excellent optical properties.

Linear and Substantially Linear Ethylene Polymers

By way of definition, as used herein, "interpolymer" means a polymer of two or more comonomers, e.g. a copolymer, terpolymer, etc.

Interpolymers which are useful in the present invention are linear ethylene polymers and substantially linear ethylene polymers. The amount of such polymers, if any, in the composition will vary depending on the hot tack properties desired, the other components, the type of linear or substantially linear polyethylene, and the substrate, if present.

The linear or substantially linear ethylene polymers which may be employed herein are characterized by a density of at least about 0.87, preferably at least 0.89 g/cm$^3$. Correspondingly, the density is usually less than 0.96, preferably less than about 0.94 g/cm$^3$.

Another characteristic of the linear or substantially linear ethylene polymers which may be employed herein is a molecular weight distribution, $M_w/M_n$ of less than or equal to about 5, preferably less than or equal to about 4.

Yet another characteristic of the linear or substantially linear ethylene polymer which may be employed herein is a melt index, 12, as measured in accordance with ASTM D-1238, Condition 190° C./2.16 kg of from about 0.5 to about 20.0 dg/min. It has been discovered that linear ethylene polymers or substanitally linear ethylene polymers having the aforementioned properties yield compositions in accordance with the present invention which have a high hot tack.

The linear or substantially linear ethylene polymer which may be employed herein may be a homopolymer or copolymer of ethylene with one or more monomers. Preferred monomers or copolymers of ethylene with one or more monomers. Preferred monomers include $C_3$—$C_3$ alpha-olefins such as 1-butene, 1-pentene, 4-methyl-1-pentene 1-hexene, 1-heptene, 1-octene.

The linear ethylene polymer may be an ethylene polymer prepared using a transition metal catalyst, for example, a single site catalyst or a Ziegler-Natta catalyst. The term "linear polymer" comprises both homogeneous linear polymers and heterogeneous linear polymers. By the term "homogenous", it is meant that any comonomer is randomly distributed within a given interpolymer molecule and substantially all of the interpolymer molecules have the same ethylene/comonomer ratio within that interpolymer. However, unlike heterogeneous polymers, when a homogeneous polymer has a melting peak greater than 115° C. (such as is the case of polymers having a density greater than 0.940 g/cm$^3$), such polymers do not additionally have a distinct lower temperature melting peak.

Further, the homogeneous linear or substantially linear ethylene polymers will lack a measurable high density fraction, (i.e. essentially linear or homopolymer fraction as measured by Temperature Rising Elution Fractionation which is described in U.S. Pat. No. 5,089,321, and which is incorporated in its entirety into and made a part of this application), e.g they will not contain any polymer fraction that has a degree of branching less than or equal to 2 methy/1000 carbons.

The homogeneous linear or substantially linear ethylene polymers are characterized as having a narrow molecular weight distribution ($M_w/M_n$). For the linear and substantially linear ethylene polymers, the $M_w/M_n$ is from 1.5 to 3.0, preferably from 1.8 to 2.2.

The distribution of comonomer branches for the homogeneous linear and substantially linear ethylene polymers is characterized by its SCBDI (Short Chain Branch Distribution Index) or CDBI (Composition Distribution Branch Index) and is defined as the weight percent of the polymer molecules having a comonomer content within 50 percent of the median total molar comonomer content. The CDBI of a polymer is readily calculated from data obtained from techniques known in the art, such as, for example, temperature rising elution fractionation (abbreviated herein as "TREF") as described, for example, by Wild et al., *Journal of Polymer Science Poly. Phys. Ed.*, Vol. 20, p. 441 (1982), or in U.S. Pat. Nos. 4,798,081 and 5,008,204, each of which are incorporated herein by reference. The SCBDI or CDBI for the substantially linear polymers useful in the compositions of the present invention is preferably greater than about 50 percent, especially greater than about 70 percent, more preferably greater than about 90 percent.

Homogeneous linear ethylene/α-olefin interpolymers may be prepared using polymerization processes (e.g., as described by Elston in U.S. Pat. No. 3,645,992, the disclosure of which is incorporated herein by reference) which provide a homogeneous short chain branching distribution. In his polymerization process, Elston uses soluble vanadium catalyst systems to make such polymers. However, others such as Mitsui Petrochemical Company and Exxon Chemical Company have used so-called single site catalyst systems to make polymers having a homogeneous linear structure. Homogeneous linear ethylene/α-olefin interpolymers are currently commercially available from Mitsui Petrochemical Company under the tradename "Tafmer".

In contrast to homogeneous linear ethylene polymers (which have fewer than 0.01 long chain branches per 1000 carbons), substantially linear ethylene polymers are homogeneous polymers having long chain branching. In particular, as used herein, "substantially linear" means that the polymer backbone is substituted with about 0.01 long-chain branches/1000 carbons to about 3 long-chain branches/1000 carbons, preferably from about 0.01 long-chain branches/1000 carbons to about 1 long-chain branch/1000 carbons, and more preferably from about 0.05 long-chain branches/1000 carbons to about 1 long-chain branch/1000 carbons.

Long chain branching is defined in U.S. Pat. No. 5,783,638 incorporated herein by reference.

Long chain branching (LCB) is defined herein as a chain length of at least one (1) carbon less than the number of carbons in the comonomer, whereas short chain branching (SCB) is defined herein as a chain length of the same number of carbons in the residue of the comonomer after it is incorporated into the polymer molecule backbone. For example, an ethylene/1-octene substantially linear polymer has backbones with long chain branches of at least seven (7) carbons in length, but it also has short chain branches of only six (6) carbons in length.

Long chain branching can be distinguished from short chain branching by using $^{13}C$ nuclear magnetic resonance (NMR) spectroscopy and to a limited extent, e.g., for ethylene homopolymer it can be quantified using the method of Randall (*Rev. Macromol. Chem. Phys.*, C29 (2&3), p. 285–297), the disclosure of which is incorporated herein by reference. However, as a practical matter, current $^{13}C$ nuclear magnetic resonance spectroscopy cannot determine the length of a long chain branch in excess of about six (6) carbon atoms and as such, this analytical technique cannot distinguish between a seven (7) carbon branch and a seventy (70) carbon branch. The long chain branch can be as long as about the same length as the length of the polymer backbone.

The homogeneous and substantially linear ethylene polymers used in the composition of this invention are known, and they and their method of preparation are fully described in, for example, U.S. Pat. Nos. 5,272,236 and 5,278,272, both of which are incorporated in their entirety into and made a part of this application.

Methods for determining the amount of long chain branching present, both qualitatively and quantitatively, are known in the art. For qualitative methods for determination, see, e.g, U.S. Pat. Nos. 5,272,236 and 5,278,272, the disclosures of both of which are incorporated herein by reference, which disclose the use of an apparent shear stress vs. apparent shear rate plot to identify melt fracture phenomena.

For quantitative methods for determining the presence of long chain branching, see, e.g., U.S. Pat. Nos. 5,272,236 and 5,278,272; Randall (Rev. Macromol. Chem. Phys., C29 (2&3), p. 285–297), which discusses the measurement of long chain branching using 13C nuclear magnetic resonance spectroscopy, Zimm, G. H. and Stockmayer, W. H., J. Chem. Phys., 17, 1301 (1949); and Rudin, A., Modern Methods of Polymer Characterization, John Wiley & Sons, New York (1991) pp. 103–112, which discuss the use of gel permeation chromatography coupled with a low angle laser light scattering detector (GPC-LALLS) and gel permeation chromatography coupled with a differential viscometer detector (GPC-DV). Each of the these references is incorporated herein by reference.

The "Theological processing index" (PI) is the apparent viscosity (in kpoise) of a polymer measured by a gas extrusion rheometer (GER). The gas extrusion rheometer is described by M. Shida, R. N. Shroff and L. V. Cancio in *Polymer Engineering Science* Vol. 17, No. 11, p. 770 (1977), and in "Rheometers for Molten Plastics" by John Dealy, published by Van Nostrand Reinhold Co. (1982) on pp. 97–99, both publications of which are incorporated by reference herein in their entirety. GER experiments are performed at a temperature of 190° C., at nitrogen pressures between 250 to 5500 psig using about a 7.54 cm diameter, 20:1 L/D die with an entrance angle of 180°. For the substantially linear ethylene polymers useful herein, the PI is the apparent viscosity (in kpoise) of a material measured by GER at an apparent shear stress of $2.15 \times 10^6$ dyne/cm$^2$. The substantially linear ethylene polymers useful herein preferably have a PI in the range of about 0.01 kpoise to about 50 kpoise, preferably about 15 kpoise or less. The substantially linear ethylene polymers useful herein have a PI less than or equal to about 70% of the PI of a comparative linear ethylene polymer (either a Ziegler polymerized polymer or a linear uniformly branched polymer as described by Elston in U.S. Pat. No. 3,645,992) at about the same $I_2$ and $M_w/M_n$.

Substantially linear ethylene polymers will further be characterized as having a resistance to melt fracture. An apparent shear stress versus apparent shear rate plot is used to identify the melt fracture phenomena. According to Ramamurthy in the *Journal of Rheology* 30(2), 337–357, 1986, above a certain critical flow rate, the observed extrudate irregularities may be broadly classified into two main types: surface melt fracture and gross melt fracture.

Surface melt fracture occurs under apparently steady flow conditions and ranges in detail from loss of specular film gloss to the more severe form of "sharkskin." The onset of surface melt fracture (OSMF) is characterized at the beginning of losing extrudate gloss at which the surface roughness of the extrudate can only be detected by 40× magnification. The critical shear rate at the onset of surface melt fracture for the substantially linear ethylene interpolymers and homopolymers is at least 50 percent greater than the critical shear rate at the onset of surface melt fracture of a comparative linear ethylene polymer (either a Ziegler polymerized polymer or a linear uniformly branched polymer as described by Elston in U.S. Pat. No. 3,645,992) having about the same $I_2$ and $M_w/M_n$.

Gross melt fracture occurs at unsteady extrusion flow conditions and ranges in detail from regular (alternating rough and smooth, helical, etc.) to random distortions. For commercial acceptability, (e.g., in blown films and bags therefrom), surface defects should be minimal, if not absent, for good film quality and properties. The critical shear stress at the onset of gross melt fracture for the substantially linear ethylene polymers used in making the film structures of the present invention is greater than about $4 \times 10^6$ dynes/cm$^2$. The critical shear rate at the onset of surface melt fracture (OSMF) and the onset of gross melt fracture (OGMF) will be used herein based on the changes of surface roughness and configurations of the extrudates extruded by a GER.

The substantially linear ethylene polymers will be characterized as having an $I_{10}/I_2$ (ASTM D-1238), which is greater than or equal to 5.63, and is preferably from about 6.5 to 15, more preferably from about 7 to 10. The molecular weight distribution ($M_w/M_n$), measured by gel permeation chromatography (GPC), is defined by the equation: $M_w/M_n \leq (I_{10}/I_2) - 4.63$, and is preferably between about 1.5 and 2.5. For the substantially linear ethylene polymers, the $I_{10}/I_2$ ratio indicates the degree of long-chain branching, i.e. the larger the $I_{10}/I_2$ ratio, the more long-chain branching in the polymer.

Substantially linear ethylene polymers have a highly unexpected flow property, where the $I_{10}/I_2$ value of the polymer is essentially independent of the polydispersity index (i.e., $M_w/M_n$) of the polymer. This is contrasted with conventional linear homogeneously branched and linear heterogeneously branched polyethylene resins having rheological properties such that to increase the $I_{10}/I_2$ value the polydispersity index must also be increased.

The homogeneous linear or substantially linear ethylene polymer may be suitably prepared using a constrained geometry metal complex, such as are disclosed in U.S. application Ser. No. 545,403, filed Jul. 3, 1990 (EP-A-416, 815); U.S. application Ser. No. 702,475, filed May 20, 1991 (EP-A-514,828); as well as U.S. Pat. Nos. 5,470,993, 5,374, 696, 5,231,106, 5,055,438, 5,057,475, 5,096,867, 5,064,802, and 5,132,380. In U.S. application Ser. No. 720,041, filed Jun. 24, 1991, (EP-A-514,828) certain borane derivatives of the foregoing constrained geometry catalysts are disclosed and a method for their preparation taught and claimed. In U.S. Pat. No. 5,453,410 combinations of cationic constrained geometry catalysts with an alumoxane were disclosed as suitable olefin polymerization catalysts. For the teachings contained therein, the aforementioned pending United States Patent applications, issued United States Patents and published European Patent Applications are incorporated herein by reference.

The heterogeneous linear ethylene polymers are homopolymers of ethylene or copolymers of ethylene and one or more $C_3$ to $C_8$ alpha olefins. Both the molecular weight distribution and the short chain branching distribution, arising from alpha olefin copolymerization, are relatively broad compared to homogeneous linear ethylene polymers. Heterogeneous linear ethylene polymers can be made in a solution, slurry, or gas phase process using a Ziegler-Natta catalyst, and are well known to those skilled in the art. For example, see U.S. Pat. No. 4,339,507, incorporated herein by reference.

Low Density Ethylene Polymer

The amount, if any, of low density ethylene polymer, i.e., low density polyethylene, in the composition will vary depending on the hot tack properties desired, the other components, the type of low density polyethylene, and the substrate, if present.

The low density ethylene polymer may be a homopolymer of ethylene or a copolymer of ethylene and another monomer that is produced, for example, by a free radical polymerization. Suitable low density ethylene polymers are described in, for example, GB 1,096,945 and U.S. Pat. No. 2,825,721, incorporated herein by reference. The other monomers are often copolymerized with ethylene to produce a polymer having different properties than that of the homopolymer. If employed, comonomer is generally incorporated at about I to about 20 weight percent based on the weight of the monomers. Preferred comonomers include acetates (such as vinyl acetate), acrylics (such as acrylic or methacrylic acid), and acrylates (such as methylacrylate, butylacrylate, methylmethacrylate, or hydroxyethylmethylacrylate). The melt index of the low density ethylene polymer useful herein is typically from about 0.1 to about 20, preferably from about 0.4 to about 12 dg/min. Generally, increasing the average molecular weight within this range, i.e., lowering the melt index, usually produces a composition which is useful for making a film having increased tensile strength, increased impact properties, increased seal strength, and lower optical properties.

The density of the low density ethylene polymers which are useful herein varies depending on whether homopolymer or copolymers are to be employed but is usually from about 0.91–0.96 g/cm$^3$. The density of the homopolymer low density ethylene polymer is generally from about 0.91 to about 0.94, preferably from about 0.915 to about 0.925 g/cm$^3$. The density of copolymer low density ethylene polymer is generally from 0.92 to 0.96 g/cm$^3$, preferably from 0.93 to 0.95 g/cm$^3$.

Preferred Compositions

The preferred compositions of the instant invention typically comprise at least about 87, preferably at least about 90 weight percent of linear ethylene polymer, substantially linear ethylene polymer, low density ethylene polymer or a mixture thereof. Correspondingly, the preferred compositions typically comprise no more than about 98, preferably no more than about 96 weight percent of linear ethylene polymer, substantially linear ethylene polymer, low density ethylene polymer or a mixture thereof.

Typically, the compositions of the present invention increase the ultimate hot tack by at least 15%, preferably at least 25% over similar compositions which do not have polypropylene. Also, the compositions of the present invention often exhibit initiation temperatures which are at least 5, preferably at least 10° C. lower than similar compositions which do not have polypropylene.

Preferred compositions of the present invention for extrusion coating often include mixtures of the linear or substantially linear ethylene polymer and low density ethylene polymer. The amount of each polymer within the composition will vary depending upon the desired characteristics and the amount and type of polypropylene.

A particularly preferable composition of the present invention for extrusion coating comprises from about 2 to about 13 weight percent polypropylene, from about 67 to about 93, more preferably from about 80 to about 90, weight percent linear or substantially linear ethylene polymer and from about 5 to about 20 weight percent low density polyethylene.

The preferred compositions for extrusion coating of the present invention often exhibit a melt index, $I_2$ as measured in accordance with ASTM D-1238, Condition 190° C./2.16 kg of from about 4 to about 20 dg/min. and a density of from about 0.89 to about 0.91 g/cm$^3$. Compositions of this type often exhibit advantageous neck-in and/or draw resonance for extrusion coating applications.

Heat Sealable Films Made with the Composition of the Present Invention

The compositions of the present invention may be formed in any convenient manner. Typically, it is suitable to melt blend the individual components. In the case of melt blending, the polymers are first mixed and then extruded in a compounding extruder in order to obtain pellets that contain a combination of the materials. Typically, the pellets are from about 10 to about 120 pellets/gram, preferably from about 20 to about 40 pellets gram.

If forming a heat sealable film having the inventive composition, then it is also suitable to dry blend the individual components. In dry blending, pellets of the different materials are mixed together and then added directly to the extruder used to manufacture the film. Optionally, additional additives such as slip, anti-block, and polymer process aid can be incorporated in either the melt blends or dry blends.

Heat sealable films made with the composition of the present invention may be employed in either monolayer or multilayer film structures or as laminates. Regardless of how the film is utilized, it may be prepared by a variety of processes that are well known to those of skill in the art.

Film structures may be made by conventional fabrication techniques, e.g. simple bubble extrusion, biaxial orientation processes (such as tenter frames or double bubble processes), simple cast/sheet extrusion, coextrusion, lamination, etc. Conventional simple bubble extrusion processes (also known as hot blown film processes) are described, for example, in *The Encyclopedia of Chemical Technology*, Kirk-Othmer, Third Edition, John Wiley & Sons, New York, 1981, Vol. 16, pp. 416–417 and Vol. 18, pp. 191–192, the disclosures of which are incorporated herein by reference. Biaxial orientation film manufacturing processes such as described in the "double bubble" process of U.S. Pat. No. 3,456,044 (Pahlke), and the processes described in U.S. Pat. No. 4,352,849 (Mueller), U.S. Pat. Nos. 4,820,557 and 4,837,084 (both to Warren), U.S. Pat. No. 4,865,902 (Golike et al.), U.S. Pat. No. 4,927,708 (Herran et al.), U.S. Pat. No. 4,952,451 (Mueller), and U.S. Pat. Nos. 4,963,419 and 5,059,481 (both to Lustig et al.), the disclosures of which are incorporated herein by reference, can also be used to make the novel film structures of this invention. Biaxially oriented film structures can also be made by a tenter-frame technique, such as that used for oriented polypropylene.

Other multilayer film manufacturing techniques for food packaging applications are described in *Packaging Foods With Plastics* by Wilmer A. Jenkins and James P. Harrington (1991), pp. 19–27, and in "Coextrusion Basics" by Thomas I. Butler, *Film Extrusion Manual: Process, Materials, Properties*. pp. 31–80 (published by TAPPI Press (1992)) the disclosures of which are incorporated herein by reference.

In certain embodiments of this invention, at least one heat sealable, innermost or outermost layer (i.e., skin layer) of a film structure comprises the blend of the polypropylene polymer and linear or substantially linear ethylene polymer, low density polyethylene or mixture. This heat sealable layer can be coextruded with other layer(s) or the heat sealable layer can be laminated onto another layer(s) or substrate in a secondary operation, such as that described in *Packaging Foods With Plastics*, ibid, or that described in "Coextrusion For Barrier Packaging" by W. J. Schrenk and C. R. Finch, *Society of Plastics Engineers RETEC Proceedings* June 15–17 (1981), pp. 211–229, the disclosures of which are incorporated herein by reference. Preferable substrates include papers, foils, oriented polypropylenes such as industrial grade or BICOR LBW®, polyamides, polyesters, polyethylenes, polyethylene terephthalate, and, metallized substrates.

Should a multilayer film be desired, such may be obtained from a monolayer film which has been previously produced via tubular film (i.e., blown film techniques) or flat die (i.e. cast film) as described by K. R. Osborn and W. A. Jenkins in "Plastic Films, Technology and Packaging Applications" (Technomic Publishing Co., Inc. (1992)), the disclosures of which are incorporated herein by reference, wherein the sealant film must go through an additional post-extrusion step of adhesive or extrusion lamination to other packaging material layers. If the sealant film is a coextrusion of two or more layers (also described by Osborn and Jenkins), the film may still be laminated to additional layers of packaging materials, depending on the other physical requirements of the final packaging film. "Laminations vs. Coextrusions" by D. Dumbleton (*Converting Magazine*, September 1992), the disclosure of which is incorporated herein by reference, also discusses lamination versus coextrusion. Monolayer and coextruded films can also go through other post-extrusion techniques, such as a biaxial orientation process and irradiation. With respect to irradiation, this technique can also precede extrusion by irradiating the pellets from which the film is to be fabricated prior to feeding the pellets into the extruder, which increases the melt tension of the extruded polymer film and enhances processability.

Extrusion coating is yet another technique for producing packaging materials. Similar to cast film, extrusion coating is a flat die technique. A heat-sealable film comprised of the compositions of the present invention can be extrusion coated onto a substrate either in the form of a monolayer or a coextruded extrudate according to, for example, the processes described in U.S. Pat. No. 4,339,507 incorporated herein by reference. Utilizing multiple extruders or by passing the various substrates through the extrusion coating system several times can result in multiple polymer layers each providing some sort of performance attribute whether it be barrier, toughness, or improved hot tack or heat sealability. Some typical end use applications for multi-layered/multi-substrate systems are for cheese packages. Other end use applications include, but are not limited to moist pet foods, snacks, chips, frozen foods, meats, hot dogs, and numerous other applications.

In those embodiments in which the film comprises the blend of the homogeneous linear or substantially linear ethylene polymer and/or low density ethylene polymer, and the polypropylene polymer, other layers of the multilayer structure may be included to provide a variety of performance attributes. These layers can be constructed from various materials, including blends of homogeneous linear or substantially linear ethylene polymers with polypropylene polymers, and some layers can be constructed of the same materials, e.g some films can have the structure A/B/C/B/A wherein each different letter represents a different composition. Representative, nonlimiting examples of materials in other layers are: poly(ethylene terephthalate) (PET), ethylene/vinyl acetate (EVA) copolymers, ethylene/acrylic acid (BAA) copolymers, ethylene/methacrylic acid (EMAA) copolymers, LLDPE, HDPE, LDPE, graft-modified ethylene polymers (e.g maleic anhydride grafted polyethylene), styrene-butadiene polymers (such as K-resins, available from Phillips Petroleum), etc. Generally, multilayer film structures comprise from 2 to about 7 layers.

The thickness of the multilayer structures is typically from about 1 mil to about 4 mils (total thickness). The heat sealable film layer varies in thickness depending on whether it is produced via coextrusion or lamination of a monolayer or coextruded film to other packaging materials. In a coextrusion, the heat sealable film layer is typically from about 0.1 to about 3 mils, preferably from about 0.4 to about 2 mils. In a laminated structure, the monolayer or coextruded heat sealable film layer is typically from about 0.5 to about 2 mils, preferably from about 1 to 2 mils. For a monolayer film, the thickness is typically between about 0.4 mil to about 4 mils, preferably between about 0.8 to about 2.5 mils.

The heat sealable films of the invention can be made into packaging structures such as form-fill-seal structures or bag-in-box structures. For example, one such form-fill-seal operation is described in *Packaging Foods With Plastics,* ibid, pp. 78–83. Packages can also be formed from multi-layer packaging roll stock by vertical or horizontal form-fill-seal packaging and thermoform-fill-seal packaging, as described in "Packaging Machinery Operations: No. 8, Form-Fill-Sealing, A Self-Instructional Course" by C. G. Davis, *Packaging Machinery Manufacturers Institute* (April 1982); *The Wiley Encyclopedia of Packaging Technology* by M. Bakker (Editor), John Wiley & Sons (1986), pp. 334, 364–369; and *Packaging: An Introduction* by S. Sacharow and A. L. Brody, Harcourt Brace Javanovich Publications, Inc. (1987), pp.322–326. The disclosures of all of the preceding publications are incorporated herein by reference. A particularly useful device for form-fill-seal operations is the Hayssen Ultima Super CMB Vertical Form-Fill-Seal Machine. Other manufacturers of pouch thermoforming and evacuating equipment include Cryovac and Koch. A process for making a pouch with a vertical form-fill-seal machine is described generally in U.S. Pat. Nos. 4,503,102 and 4,521,437, both of which are incorporated herein by reference. Film structures containing one or more layers comprising a heat sealable film of the present invention are well suited for the packaging of potable water, wine, cheese, potatoes, condiments, and similar food products in such form-fill-seal structures.

The compositions and heat sealable films of this invention and their use are more fully described by the following examples. Unless indicated to the contrary, all parts and percentages are by weight.

EXAMPLES

The polymers of the table entitled "Polymers" were utilized in preparing the compositions and films of the examples and comparative examples.

POLYMERS

| Polymer Type | Polymer designation | Density (g/cm$^3$) | I$_2$ (g/10 min.) | Mw/Mn | Melting point (Deg C.) |
|---|---|---|---|---|---|
| Polyolefin Plastomer | SLEP 1 | 0.902 | 7.5 | 2.7 | 101 |
| Polyolefin Plastomer | SLEP 2 | 0.898 | 20 | | 96 |
| AFFINITY* PL1280 | SLEP 3 | 0.900 | 6 | 2.50 | 98 |
| AFFINITY SM8250 | SLEP 4 | 0.885 | 30 | | 92 |
| LLDPE | LEP 1 | 0.921 | 5.4 | 3.99 | 119 |
| Exxon's Exact 3139 | Ethylene-1-hexene Copolymer | 0.902 | 7.0 | 2.2 | 99 |
| INSPIRE* H700-12 | PP 1-Homopolymer | 0.90 | 12 Melt Flow | | 165 |
| INSPIRE* H500-35 | PP 2-Homopolymer | 0.90 | 35 Melt Flow | | 165 |
| INSPIRE* C105-2† | PP 3-Copolymer with 16–20% ethylene | 0.90 | 2 Melt Flow | | 160 |
| Profax ® SR549-M | PP 4-Copolymer with 3–4% ethylene | 0.90 | 11.5 Melt Flow | | 150 |
| DOW LDPE | LDPE 1 | 0.918 | 0.47 | 7.6 | 105 |
| DOW LDPE | LDPE 2 | 0.923 | 4.2 | 5.78 | 112 |
| DOW LDPE | LDPE 3 | 0.918 | 8.0 | 6.97 | 105 |
| DOW LDPE | LDPE 4 | 0.918 | 12.0 | 6.02 | 105 |
| PRIMACOR* 4608 | EAA 1 | (6.5% AA) | 7.7 | 5.19 | 99 |

*A Trademark of The Dow Chemical Company.
Notes:

-continued

POLYMERS

| Polymer Type | Polymer designation | Density (g/cm³) | I₂ (g/10 min.) | Mw/Mn | Melting point (Deg C.) |
|---|---|---|---|---|---|

SLEP—substantially linear ethylene polymer
SLEP 1 contains 8 weight percent LDPE
LEP 1 contains 18 weight percent LDPE
PP indicates polypropylene
Ethylene-1-hexene copolymer is an Exxon Exact ® Plastomer
Profax ® is a registered trademark of Montel
†INSPIRE polypropylene is an impact polypropylene copolymer
LDPE indicates low density polyethylene
Melt Flow for Polypropylene is in grams/10 min at 230 Deg C.
EAA is a copolymer of ethylene and acrylic acid
AA is the weight percent of acrylic acid in the EAA copolymer

Example 1—Preparation of Compositions

Polymer blends can be prepared in several fashions. Dry blending of each polymer can be achieved by adding the specific amount of each component by weight and then blending by hand or by mechanical means such as tumble or pneumatic blending. Melt blends can also be produced by extrusion compounding resulting in pellets containing each component at their proper concentrations. Each individual polymer could also be introduced into the feed section of the extruder being used to form the final film, laminate, or extrusion coating. Some blend systems were dry blending only, two and three component melt blends, or two component melt blends which were then dry blended with a third component. The blending mechanism didn't negatively effect the boost in performance as claimed by this application.

Example 2—Formation of Laminates

Typically, laminates are formed by extrusion coating of the claimed polymer system onto different substrates at various thicknesses. The resulting structure is then utilized for performance testing. Coextrusion of the polymer system can also be utilized where as the improved hot tack system is at the sealing surface of the resulting multi-layered extrusion. Lamination of films produced by claimed invention onto a variety of substrates will also result in improved hot tack performance when incorporating claimed polymer system. Extrusion coating performance was evaluated on a 3 ½", 30:1 L/D, Black Clawson extrusion coater fitted with a 30" Cloeren internally deckled die and Cloeren feedblock. The die gap was set at 25 mils utilizing a 6 inch air gap (the distance from the die opening to the substrate/chill roll interface). The screw speed was maintained at approximately 90 rpm to produce a 1 mil coating while running the various substrates at 440 fpm through the extrusion coater. All paper structures were produced on 50 lb Kraft paper. Other substrates evaluated were produced by slip sheets (attach tape to the leading edge of the substrate to be tested and then dropped onto the traveling Kraft paper thus pulling the sample substrate under the extrusion die onto the chill roll while being coated with the polymer system to be evaluated).

Example 3—Measurement of Properties of Laminates

Hot tack strengths were evaluated using either a DTC Hot Tack Tester Model No. DTC 52D available from Topwave or a Hot Tack Tester Model 3000 version 2 available from J&B Instruments and the instructions for each therewith. The coated samples (1 inch strips) were sealed at 40 psig bar pressure, with a 0.5 second dwell time, a 0.4 second delay time and a peel speed of 150 mm/sec. Five evaluations were performed on each sample at each temperature and the average value is reported in the tables below. All hot tack data is reported in strength measurements of Newtons/inch (N.in).

TABLE 1

HOT TACK DATA FOR 1 MIL COATING ONTO PAPER

| Temp (Deg C.) | 80 | 90 | 100 | 110 | 120 | 130 | 140 | 150 | 170 | 190 | 210 |
|---|---|---|---|---|---|---|---|---|---|---|---|
| Comparative - LEP 1 | | | 0.933 | 2.594 | 3.187 | 2.755 | 1.968 | 1.974 | | | |
| SLEP 1 w/10% PP 4 | 0.2 | 1.753 | 5.995 | 9.428 | 7.756 | 7.427 | 6.855 | 5.026 | 6.046 | 5.858 | 4.745 |
| SLEP 1 w/20% PP 4 | 0.2 | 1.492 | 1.977 | 9.135 | 9.233 | 8.298 | 7.599 | 3.902 | 1.259 | | |

TABLE 2

HOT TACK DATA FOR 1 MIL COATING ONTO ALUMINUM FOIL

| Temp (Deg C.) | 80 | 90 | 100 | 110 | 120 | 130 | 140 | 150 |
|---|---|---|---|---|---|---|---|---|
| Comparative - SLEP 1 | | 0.253 | 2.92 | 4.869 | 4.808 | 4.468 | 4.956 | 4.24 |
| SLEP 1 w/ 10% PP 4 | 0.229 | 2.24 | 5.669 | 8.645 | 10.375 | 10.892 | 7.424 | 6.73 |
| SLEP 1 w/ 20% PP 4 | | 0.576 | 1.994 | 4.152 | 4.89 | 5.334 | 9.288 | 8.109 |

TABLE 3

HOT TACK DATA FOR 1 MIL COATING ONTO BICOR ® IG ORIENTED POLYPROPYLENE FROM MOBIL

| Temp (Deg C.) | 80 | 90 | 100 | 110 | 120 | 130 | 140 | 150 |
|---|---|---|---|---|---|---|---|---|
| Comparative - SLEP 1 | 0.617 | 0.997 | 1.282 | 1.398 | 1.047 | 0.972 | 0.8 | 0.746 |
| SLEP 1 w/ 10% PP 4 | 0.672 | 5.49 | 5.74 | 4.453 | 4.659 | 1.937 | 0.9 | 0.898 |
| SLEP 1 w/ 20% PP 4 | 0.481 | 3.918 | 5.626 | 4.832 | 3.18 | 0.568 | 0.532 | 0.479 |

TABLE 4

HOT TACK DATA FOR 1 MIL COATING ONTO BICOR ® LBW OPP (ORIENTED POLYPROPYLENE FROM MOBIL)

| Temp (Deg C.) | 80 | 90 | 100 | 110 | 120 | 130 | 140 | 150 |
|---|---|---|---|---|---|---|---|---|
| Comparative - SLEP 1 | 0.39 | 1.3 | 1.43 | 1.24 | 1.04 | 0.78 | 0.94 | 1.06 |
| SLEP 1 w/ 10% PP 4 | 0.68 | 4.83 | 5.8 | 3.94 | 3.32 | 2.63 | 0.82 | 1.25 |
| SLEP 1 w/ 20% PP 4 | 0.484 | 2.987 | 5.907 | 4.682 | 2.922 | 0.918 | 0.801 | |

TABLE 5

HOT TACK DATA FOR 1 MIL COATING ONTO HOSTAPHAN ® 2DEF PRIMED PET (POLYETHYLENE TEREPHTHALATE) FILM FROM HOECHST DIAFOIL.

| Temp (Deg C.) | 80 | 90 | 100 | 110 | 120 | 130 | 140 | 150 |
|---|---|---|---|---|---|---|---|---|
| Comparative - SLEP 1 | | 0.781 | 1.384 | 1.263 | 0.923 | 0.804 | 0.672 | 0.65 |
| SLEP 1 w/ 10% PP 4 | 0.599 | 4.967 | 6.217 | 3.878 | 3.532 | 2.327 | 3.551 | 1.668 |
| SLEP 1 w/ 20% PP 4 | 0.712 | 5.023 | 7.019 | 5.221 | 2.763 | 1.06 | 0.787 | |

TABLE 6

HOT TACK DATA FOR 1 MIL COATING ONTO PAPER - HIGHER LOADING AND DIFFERENT POLYPROPYLENE

| Temp (Deg C.) | 80 | 90 | 100 | 110 | 120 | 130 | 140 | 150 | 170 | 190 | 210 |
|---|---|---|---|---|---|---|---|---|---|---|---|
| Comparative - SLEP 1 | | | 0.534 | 3.559 | 3.438 | 3.472 | 2.001 | 1.847 | | | |
| SLEP 1 w/5% PP 4 | | 0.319 | 2.816 | 8.035 | 8.264 | 6.604 | 5.158 | 4.007 | 3.41 | 5.872 | 3.048 |
| SLEP 1 w/10% PP 4 | | 0.673 | 6.991 | 9.863 | 9.243 | 7.936 | 7.49 | 5.577 | 2.215 | | |
| SLEP 1 w/15% PP 4 | | 0.539 | 2.545 | 9.452 | 8.195 | 8.047 | 5.762 | 3.33 | 1.682 | | |
| SLEP 1 w/20% PP 4 | | 0.485 | 1.999 | 8.074 | 8.789 | 7.23 | 6.806 | 3.479 | 0.667 | | |
| SLEP 1 w/25% PP 4 | | 1.118 | 4.853 | 9.599 | 8.501 | 7.194 | 5.944 | 6.36 | 7.607 | 4.781 | 3.039 |
| SLEP 1 w/5% PP 1 | | 0.73 | 4.648 | 9.768 | 8.02 | 6.095 | 5.423 | 5.035 | 5.511 | 4.545 | 5.374 |
| SLEP 1 w/10% PP 1 | 0.262 | 1.386 | 3.916 | 9.894 | 10.204 | 7.84 | 6.741 | 6.195 | 6.697 | 6.304 | 5.195 |

TABLE 7

HOT TACK DATA FOR 1 MIL COATING ONTO ALUMINUM FOIL - HIGHER LOADINGS AND DIFFERENT POLYPROPYLENE

| Temp (Deg C.) | 80 | 90 | 100 | 110 | 120 | 130 | 140 | 150 | 170 | 190 | 210 |
|---|---|---|---|---|---|---|---|---|---|---|---|
| Comparative - SLEP 1 | | 0.212 | 2.258 | 4.576 | 5.104 | 4.979 | 5.115 | 4.356 | 3.561 | 3.37 | 2.346 |
| SLEP 1 w/5% PP 4 | | 0.475 | 3.799 | 7.296 | 10.332 | 9.768 | 9.274 | 6.786 | 4.65 | 4.438 | 4.559 |
| SLEP 1 w/10% PP 4 | 0.239 | 1.46 | 4.724 | 10.91 | 10.518 | 10.54 | 9.753 | 7.353 | 5.886 | 5.288 | 5.155 |
| SLEP 1 w/15% PP 4 | | 0.799 | 2.674 | 4.277 | 4.381 | 7.885 | 8.829 | 7.291 | 5.366 | 1.44 | |
| SLEP 1 w/20% PP 4 | | 0.664 | 1.353 | 3.069 | 3.652 | 4.692 | 7.342 | 6.94 | 4.653 | 0.955 | |
| SLEP 1 w/25% PP 4 | | 0.567 | 1.156 | 1.423 | 2.486 | 2.253 | 2.554 | 3.34 | 3.647 | 0.663 | |
| SLEP 1 w/5% PP 1 | 0.25 | 2.189 | 4.475 | 11.39 | 10.624 | 10.63 | 9.09 | 7.369 | 5.801 | 6.503 | 6.089 |
| SLEP 1 w/10% PP 1 | 0.241 | 1.882 | 5.695 | 11.83 | 12.275 | 11.26 | 9.681 | 9.464 | 7.154 | 6.938 | 6.879 |
| SLEP 1 w/15% PP 1 | | 0.652 | 2.718 | 7.047 | 8.523 | 10.45 | 9.546 | 7.145 | 6.173 | 3.633 | 2.398 |

TABLE 8

HOT TACK DATA FOR 1 MIL COATING ONTO PAPER - VARIOUS MELT INDEX AND DENSITY POLYMERS

| Temp (Deg C.) | 60 | 80 | 100 | 120 | 140 | 160 | 180 | 200 |
|---|---|---|---|---|---|---|---|---|
| Comparative - SLEP 2 w/8% LDPE 1 | 0.21 | 0.263 | 0.467 | 7.268 | 6.885 | 5.285 | 4.134 | 3.472 |
| SLEP 2 W/5% PP 1 & 8% LDPE 1 | 0.446 | 0.465 | 0.72 | 6.313 | 8.759 | 7.375 | 6.037 | 4.653 |
| SLEP 4 W/8% LDPE 1 | 0.361 | 0.365 | 0.257 | 3.45 | 2.159 | 4.547 | 3.874 | 3.459 |
| SLEP 4 W/5% PP 1 8% LDPE 1 | 0.627 | 0.738 | 0.454 | 5.147 | 4.884 | 5.071 | 4.193 | 3.926 |
| Comparative - Exact 3139 w/8% LDPE 1 | 0.448 | 0.481 | 0.44 | 0.229 | 0.774 | 1.338 | 1.825 | 0.744 |
| Exact 3139 w/5% PP 1 and 8% LDPE 1 | 0.355 | 0.43 | 0.251 | 2.842 | 8.402 | 8.053 | 7.251 | 5.739 |

TABLE 9

HOT TACK DATA FOR 1 MIL COATING ONTO PAPER - NO LDPE IN LEP

| Temp (Deg C.) | 90 | 100 | 110 | 120 | 130 | 140 | 150 |
|---|---|---|---|---|---|---|---|
| Comparative - SLEP 3 | 0.13 | 0.324 | 2.396 | 2.379 | 2.478 | 2.395 | |
| SLEP 3 W/5% PP 1 | 0.176 | 2.16 | 6.697 | 10.955 | 9.756 | 6.987 | 5.958 |

TABLE 10

HOT TACK DATA FOR 1 MIL COATING ONTO PAPER - LDPE ONLY

| Temp (Deg C.) | 100 | 110 | 120 | 130 | 140 | 150 | 170 |
|---|---|---|---|---|---|---|---|
| Comparative - LDPE 2 | | 0.163 | 0.144 | 1.19 | 2.327 | 2.687 | |
| LDPE 2 W/5% PP 1 | | 0.154 | 2.277 | 7.608 | 8.606 | 7.613 | 5.864 |
| Comparative - LDPE 3 | | 0.139 | 1.199 | 4.319 | 4.252 | 3.964 | 3.129 |
| LDPE 3 W/5% PP 1 | 0.18 | 1.582 | 5.906 | 8.552 | 8.041 | 7.086 | 5.594 |
| Comparative - LDPE 4 | 0.168 | 0.156 | 2.613 | 5.489 | 4.305 | 3.484 | |
| LDPE 4 W/5% PP 1 | 0.147 | 1.147 | 5.919 | 8.521 | 7.044 | 6.247 | |

TABLE 11

HOT TACK DATA FOR 1 MIL COATING ONTO PAPER - EAA COPOLYMER

| Temp (Deg C.) | 90 | 100 | 110 | 120 | 130 | 140 | 150 | 170 |
|---|---|---|---|---|---|---|---|---|
| Comparative - EAA 1 | 0.129 | 0.163 | 3.015 | 8.762 | 11.117 | 10.606 | 9.616 | 6.75 |
| EAA 1 W/5% PP 1 | | 0.142 | 2.111 | 10.571 | 12.15 | 13.992 | 13.405 | 10.813 |

TABLE 12

HOT TACK DATA FOR 1 MIL COATING ONTO PAPER - VARIOUS MELT FLOW POLYPROPYLENES

| Temp (Deg C.) | 80 | 90 | 100 | 110 | 120 | 130 | 140 | 150 | 160 | 170 |
|---|---|---|---|---|---|---|---|---|---|---|
| SLEP 1 w/5% PP 1 | 0.645 | 1.977 | 3.695 | 10.44 | 12.533 | 12.743 | 11.697 | 10.575 | 9.3765 | 8.178 |
| SLEP 1 w/5% PP 3 | 0.167 | 0.133 | 0.984 | 5.129 | 8.601 | 9.338 | 6.657 | 5.394 | 4.883 | 3.519 |
| SLEP 1 w/5% PP 2 | 0.154 | 0.199 | 2.014 | 6.2 | 9.108 | 8.324 | 6.72 | 7.104 | 5.246 | 3.381 |

TABLE 13

HOT TACK DATA FOR 1 MIL COATING ONTO PAPER - LOWER PERCENTAGE POLYPROPYLENE

| Temp (Deg C.) | 80 | 100 | 120 | 140 | 160 | 180 | 200 |
|---|---|---|---|---|---|---|---|
| Comparative - SLEP 1 | 0.213 | 0.559 | 6.185 | 4.913 | 2.065 | 2.221 | 0.5 |
| SLEP1 W/1% PP 1 | 0.201 | 1.038 | 7.306 | 5.647 | 3.625 | 1.831 | 0.659 |
| SLEP1 W/2% PP 1 | 0.158 | 1.593 | 9.499 | 5.604 | 4.348 | 2.464 | 2.521 |
| SLEP1 W/3% PP 1 | 0.276 | 2.955 | 8.13 | 5.48 | 4.403 | 3.115 | 3.291 |
| SLEP1 W/4% PP 1 | 0.447 | 6.138 | 9.294 | 6.644 | 5.57 | 5.348 | 6.201 |
| SLEP1 W/5% PP 1 | 1.012 | 5.293 | 9.593 | 6.457 | 4.967 | 5.057 | 5.294 |

TABLE 14

HOT TACK DATA FOR 1 MIL COATING ONTO PAPER - MODIFICATION OF A ZIEGLER-NATTA POLYMERIZED LEP

| Temp (Deg C.) | 120 | 130 | 140 | 150 | 160 | 170 |
|---|---|---|---|---|---|---|
| Comparative - LEP 1 | 0.166 | 0.273 | 0.529 | 1.584 | 2.528 | 1.911 |
| LEP 1 w/5% PP 1 | 0.183 | 1.123 | 5.019 | 8.998 | 9.552 | 7.365 |

What is claimed is:

1. A heat-sealable film layer comprising:
   (a) from about 2 to about 13 percent by weight of polypropylene which is a homopolymer or copolymer comprising at least about 93 percent propylene and less than about 8 percent alpha-olefin based on the weight of the polymer, and which has a melt flow rate of from about 1.0 to about 50 dg/minute as measured in accordance with ASTM D-1238, Condition 230° C./2.16 kg;
   (b) from about 87 to about 98 percent by weight of a polymer selected from the group consisting of linear ethylene polymer, substantially linear ethylene polymer, low density ethylene polymer, and mixtures thereof;
   wherein the linear ethylene polymer and substantially linear ethylene polymer are characterized by:
   (1) a density of from about 0.87 to about 0.96 g/cm$^3$,
   (2) a molecular weight distribution, $M_w/M_n$ of less than or equal to about 5,
   (3) a melt index, $I_2$, as measured in accordance with ASTM D-1238, Condition 190° C./2.16 kg of from about 0.5 to about 20.0 dg/minute; and
   wherein the low density ethylene polymer is characterized by:
   (1) a density of from about 0.91 to about 0.96 g/cm$^3$, and
   (2) a melt index, $I_2$, as measured in accordance with ASTM D-1238, Condition 190° C./2.16 kg of from about 0.1 to about 20.0 dg/minute
   and wherein the film layer comprises at least about 5 percent by weight of the low density ethylene polymer.

2. The layer of claim 1 wherein the low density polyethylene comprises low density polyethylene produced by a free radical polymerization.

3. The layer of claim 1 wherein the linear or substantially linear ethylene polymer comprises a copolymer of ethylene and 1-octene, ethylene and 1-butene, or ethylene and 1-hexene, ethylene and 1-pentene, ethylene and 1-heptene, or ethylene and 4 methylpentene-1.

4. The layer of claim 1 which comprises from about 67 to about 93 percent by weight linear ethylene polymer, substantially linear ethylene polymer or a mixture thereof and from about 5 to about 20 percent by weight low density polyethylene.

5. The layer of claim 1 which comprises from about 4 to about 10 percent by weight polypropylene.

6. The layer of claim 5 wherein the polypropylene is a homopolymer.

7. The layer of claim 1 which comprises from about 80 to about 90 percent by weight linear ethylene polymer or substantially linear ethylene polymer and wherein said linear ethylene polymer or substantially linear ethylene polymer is a copolymer of ethylene and 1-octene.

8. The layer of claim 7 wherein the composition has a melt index, $I_2$, as measured in accordance with ASTM D-1238, Condition 190° C./2.16 kg of from about 4.0 to about 20.0 dg/minute.

9. The layer of claim 7 wherein the composition has a density of from about 0.890 to about 0.910 g/cm$^3$.

10. A composition comprising:
    (a) from about 2 to about 13 percent by weight of polypropylene which is a homopolymer or a copolymer derived from at least about 80 percent propylene monomer and less than about 20 percent alpha-olefin monomer based on the total weight of the monomers, and which has a melt flow rate of from about 1.0 to about 50 dg/minute as measured in accordance with ASTM D-1238, Condition 230° C./2.16 kg.
    (b) from about 87 to about 98 percent by weight of a polymer selected from the group consisting of linear ethylene polymer, substantially linear ethylene polymer, low density ethylene polymer and mixtures thereof;
    wherein the linear ethylene polymer and substantially linear ethylene polymer is characterized by:
    (1) a density of from about 0.87 to about 0.960 g/cm$^3$,
    (2) a molecular weight distribution, $M_w/M_n$ of less than or equal to about 5, and
    (3) a melt index, $I_2$, as measured in accordance with ASTM D-1238, Condition 190° C./2.16 kg of from about 0.5 to about 20.0 dg/minute; and
    wherein the low density ethylene polymer is characterized by:
    (1) a density of from about 0.91 to about 0.96 g/cm$^3$, and
    (2) a melt index, $I_2$, as measured in accordance with ASTM D-1238, Condition 190° C./2.16 kg of from about 0.1 to about 20.0 dg/minute
    and wherein the composition comprises at least about 5 percent by weight of the low density ethylene polymer.

11. The composition of claim 10 wherein the low density ethylene polymer is low density polyethylene produced by a free radical polymerization.

12. The composition of claim 10 wherein the linear or substantially linear ethylene polymer is a copolymer of ethylene and 1-octene.

13. The composition of claim 10 wherein the linear or substantially linear ethylene polymer is a copolymer of ethylene and 1-butene.

14. The composition of claim 10 wherein the linear or substantially linear ethylene polymer is a copolymer of ethylene and 1-hexene.

15. The composition of claim 10 wherein the linear or substantially linear ethylene polymer is a copolymer of ethylene and 1-pentene.

16. The composition of claim 10 wherein the linear or substantially linear ethylene polymer is a copolymer of ethylene and 1-heptene.

17. The composition of claim 10 wherein the linear or substantially linear ethylene polymer is a copolymer of ethylene and 4-methyl-1-pentene.

18. The composition of claim 10 which comprises from about 67 to about 93 percent by weight linear or substantially linear ethylene polymer and from about 5 to about 20 percent by weight low density polyethylene.

19. The composition of claim 10 which comprises from about 4 to about 10 percent by weight polypropylene.

20. The composition of claim 19 wherein the polypropylene is a homopolymer.

21. The composition of claim 12 which comprises from about 80 to about 90 percent by weight of a copolymer of ethylene and 1-octene.

22. The composition of claim 21 wherein the composition has a melt index, $I_2$, as measured in accordance with ASTM D-1238, Condition 190° C./2.16 kg of from about 4 to about 20 dg/minute.

23. The composition of claim 22 wherein the composition has a density of from about 0.89 to about 0.91 g/cm³.

24. The composition of claim 10 wherein the low density ethylene polymer is a copolymer derived from at least about 80 weight percent ethylene monomer and less than about 20 weight percent of a monomer selected from the group consisting of an acrylate, an acrylic, and an acetate.

25. A packaging material having improved hot tack comprising a substrate and a polymer composition coated thereon wherein the polymer composition comprises:
 (a) from about 2 to about 13 percent by weight of polypropylene which is a homopolymer or a copolymer derived from at least about 93 percent propylene monomer and less than about 8 percent alpha-olefin monomer based on the weight of the monomers, and which has a melt flow rate of from about 1.0 to about 50 dg/minute as measured in accordance with ASTM D-1238, Condition 230° C./2.16 kg;
 (b) from about 87 to about 98 percent by weight of a polymer selected from the group consisting of linear ethylene polymer, substantially linear ethylene polymer, low density ethylene polymer, and mixtures thereof;
 wherein the linear ethylene polymer and substantially linear ethylene polymer are characterized by:
  (1) a density of from about 0.87 to about 0.96 g/cm³,
  (2) a molecular weight distribution, $M_w/M_n$ of less than or equal to about 5, and
  (3) a melt index, $I_2$, as measured in accordance with ASTM D-1238, Condition 190° C./2.16 kg of from about 0.5 to about 20.0 dg/minute; and
 wherein the low density ethylene polymer is characterized by:
  (1) a density of from about 0.91 to about 0.96 g/cm³, and
  (2) a melt index, $I_2$, as measured in accordance with ASTM D-1238, Condition 190° C./2.16 kg of from about 0.1 to about 20.0 dg/minute
 and wherein the polymer composition comprises at least about 5 percent by weight of the low density ethylene polymer.

26. The packaging material of claim 25 wherein the substrate is selected from the group consisting of papers, foils, oriented polypropylenes, polyamides, polyesters, polyethylenes, and metallized substrates.

27. The packaging material of claim 25 wherein the linear or substantially linear ethylene polymer is selected from the group consisting of a copolymer of ethylene and 1-octene, ethylene and 1-butene, ethylene and 1-hexene, ethylene and 1-pentene, ethylene and 1-heptene, and ethylene and 4-methyl-1-pentene.

28. The packaging material of claim 27 wherein the polymer composition comprises from about 67 to about 93 percent by weight linear or substantially linear ethylene polymer and from about 5 to about 20 percent by weight low density polyethylene.

29. The packaging material of claim 28 wherein the polymer composition comprises from about 4 to about 10 percent by weight polypropylene.

30. The packaging material of claim 29 wherein the polypropylene is a homopolymer.

31. The packaging material of claim 25 wherein the polymer composition is coextruded onto the substrate.

32. The packaging material of claim 26 wherein the substrate is polyethylene terephthalate.

33. A packaging structure comprising the packaging material of claim 25.

34. The heat sealable film layer of claim 1 wherein the polypropylene comprises from about 2 to about 10 weight percent.

35. The heat sealable film layer of claim 1 wherein the polypropylene comprises from about 2 to about 7 weight percent.

36. The heat sealable film layer of claim 1 wherein the polypropylene comprises from about 4 to about 10 weight percent.

* * * * *